United States Patent [19]

Heesch et al.

[11] Patent Number: 4,781,415
[45] Date of Patent: Nov. 1, 1988

[54] RECLINING INFINITELY VARIABLE SEAT LATCH WITH DUAL LOCKING MECHANISMS APPARATUS AND METHOD

[75] Inventors: Max O. Heesch, Brooklyn; Allen D. Berg, Oxford, both of Mich.

[73] Assignee: ITT Corporation, New York, N.Y.

[21] Appl. No.: 880,143

[22] Filed: Jun. 30, 1986

[51] Int. Cl.⁴ .............................................. B60N 1/02
[52] U.S. Cl. .................................... 297/362; 297/355
[58] Field of Search ......................... 248/222.3, 242; 297/362, 364, 367, 355

[56] References Cited

U.S. PATENT DOCUMENTS

| | | | |
|---|---|---|---|
| 4,573,738 | 3/1986 | Heesch | 297/362 |
| 4,657,303 | 4/1987 | Croft | 297/362 |
| 4,687,252 | 8/1987 | Bell et al. | 297/362 |
| 4,696,515 | 9/1987 | Heesch | 297/355 |

Primary Examiner—James T. McCall
Attorney, Agent, or Firm—James B. Raden; Robert P. Seitter

[57] ABSTRACT

The present invention provides an apparatus and method of utilization of the same of a recliner seat latch which is infinitely adjustable and pawl locking mechanisms. A preferred embodiment of the present invention utilizes a torsional spring to allow infinite adjustment and also has a backup pawl member which engages directly with the clutch gear of the seat latch assembly.

7 Claims, 2 Drawing Sheets

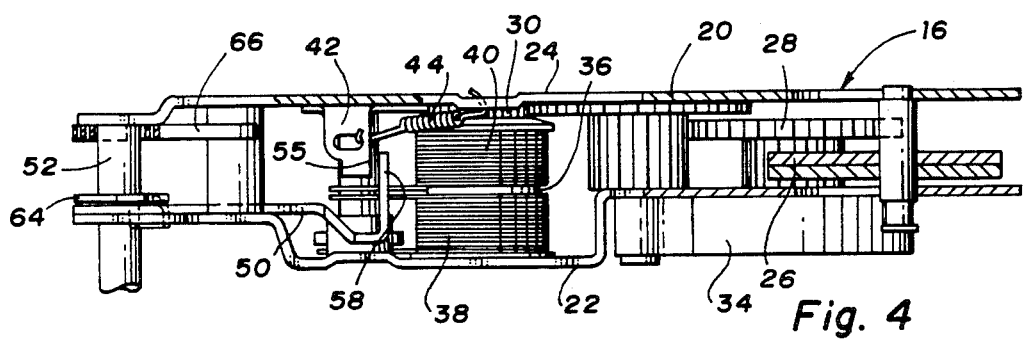
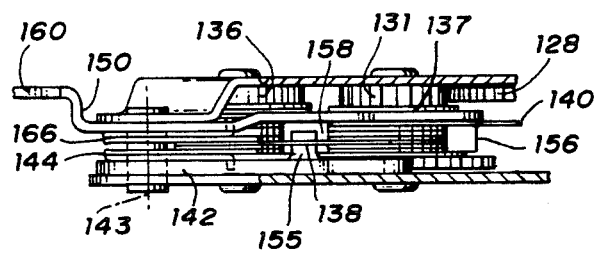
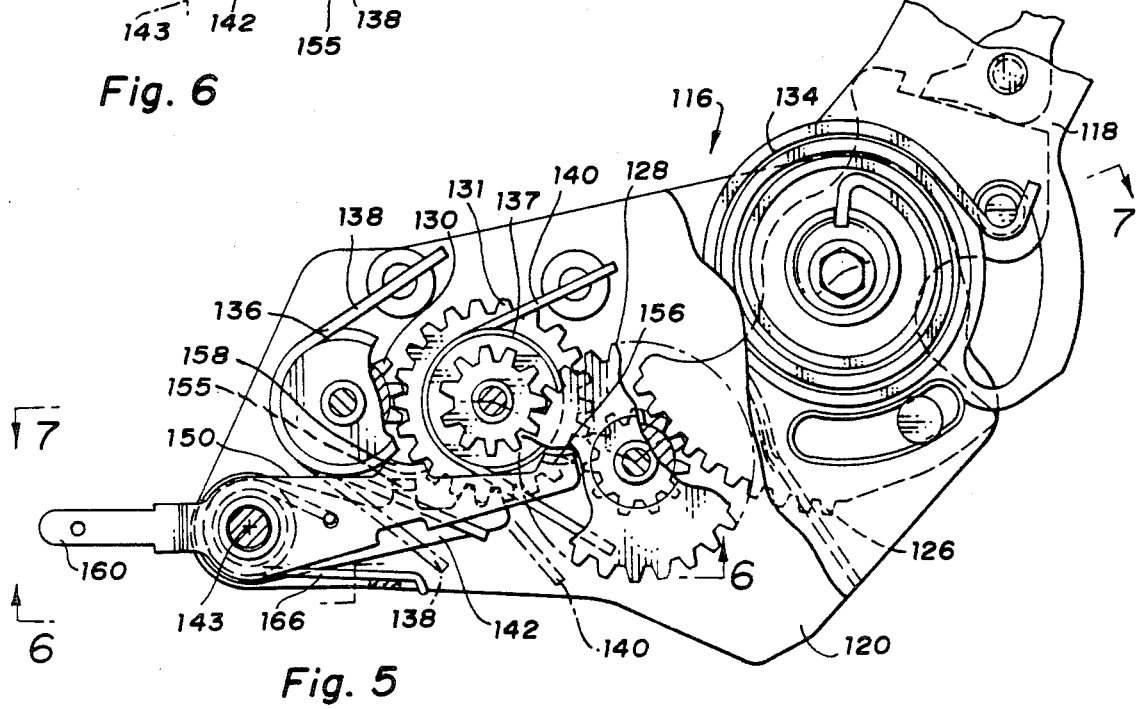
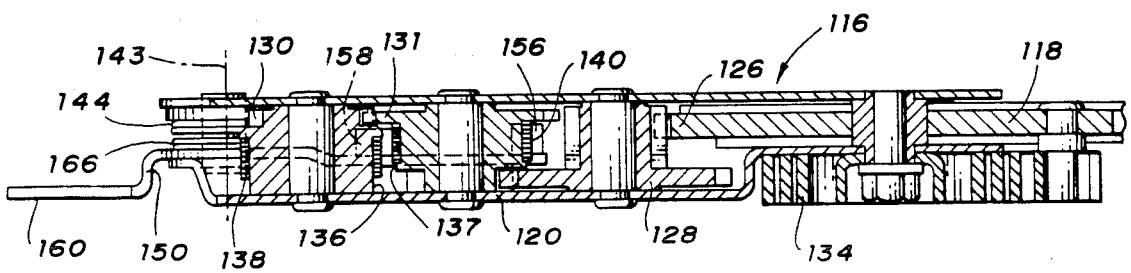

RECLINING INFINITELY VARIABLE SEAT LATCH WITH DUAL LOCKING MECHANISMS APPARATUS AND METHOD

FIELD OF THE PRESENT INVENTION

The field of the present invention is that of recliner seats. More particularly the field of the present invention is that of manually adjustable recliner seats which are infinitely variable.

DISCLOSURE STATEMENT

Recliner seats in automotive vehicles are well known. The majority of recliner seats are incremental in nature having a plurality of finite positions between an upright position and a lower reclined position.

A typical infinitely variable recliner seat latch has a seat back frame with a sector gear fixable attached at one end. The sector gear is pivotally mounted to a base frame and is operationally connected with a clutch gear through a series of gear reductions. The clutch gear has a fixably connected drum. The drum is encircled with a torsional spring locking mechanism which may be selectively released to allow adjustment in the angular position of the seat back.

It is desirable to provide a second locking mechanism for the recliner seat latch mechanism as a backup to the torsional spring clutch.

SUMMARY OF THE INVENTION

To meet the above-noted desire and to overcome other problems, the present invention is brought forth. The present invention provides a recliner seat latch that is infinitely variable which has dual locking mechanisms. The inventive seat latch has a torsion spring type clutch and a second locking system that locks the clutch gear from rotation.

It is an object of the present invention to provide an infinitely variable recliner seat latch having dual locking mechanisms. It is also an object of the present invention to provide a method of infinitely adjusting a recliner seat utilizing a recliner latch with dual locking mechanisms.

Another more specific object is an improved method of infinitely adjusting a recliner seat which is adjustable by pivotally connecting a seat back frame with a gear at one end to a base frame with a gear of the seat back frame adjacent to the base frame, angularly dependently connecting the gear of the seat frame with a clutch gear having a fixably connected drum, and torsionally restraining the drum with a torsion spring wherein the improvement comprises lockingly engaging said clutch gear with a pawl and removing the pawl and then unwinding the torsion spring to allow the clutch to freely rotate whereby the angular position of the seat back frame may be adjusted.

It is still yet another object of the present invention to provide an improved infinitely variable recliner seat latch which includes a base body frame of two transversely spaced fixably connected plates, a seat back frame pivotally mounted to the base frame within the plates, the seat back frame having a sector gear at its end adjacent to the base frame, a clutch gear rotatably mounted to the base frame having a fixably connected drum, the angular position of the clutch gear being dependent upon the angular position of the seat back frame, first and second torsion springs encircling the drum, the first torsion spring being provided for restraining rotation of the drum as the seat back frame pivots away from the drum and the second torsion spring being provided for restraining rotation of the drum when the seat back frame pivots towards the drum, wherein the improvement comprises a pawl pivotally mounted to the base frame and biased into engagement with the clutch gear, and wherein rotation of the clutch gear resultant of movement of the seat back frame away from the clutch gear causes the clutch gear to urge the pawl into further engagement, and a slider wherein axial movement of the slider releases the pawl from engagement with the clutch gear and thereafter releases the torsion springs whereby the angular position of the seat back frame may be adjusted.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 4 is a sectional view of the recliner seat latch mechanism illustrated in FIG. 2 taken along lines 4—4; and FIG. 5 is a fragmentary front elevational cut away view of a second preferred embodiment of a seat recliner latch mechanism of the present invention.

FIGS. 6 and 7 are sectional views taken along lines 6—6 and 7—7 respectively of FIG. 5.

DETAILED DESCRIPTION OF THE DRAWINGS

Figure 1:
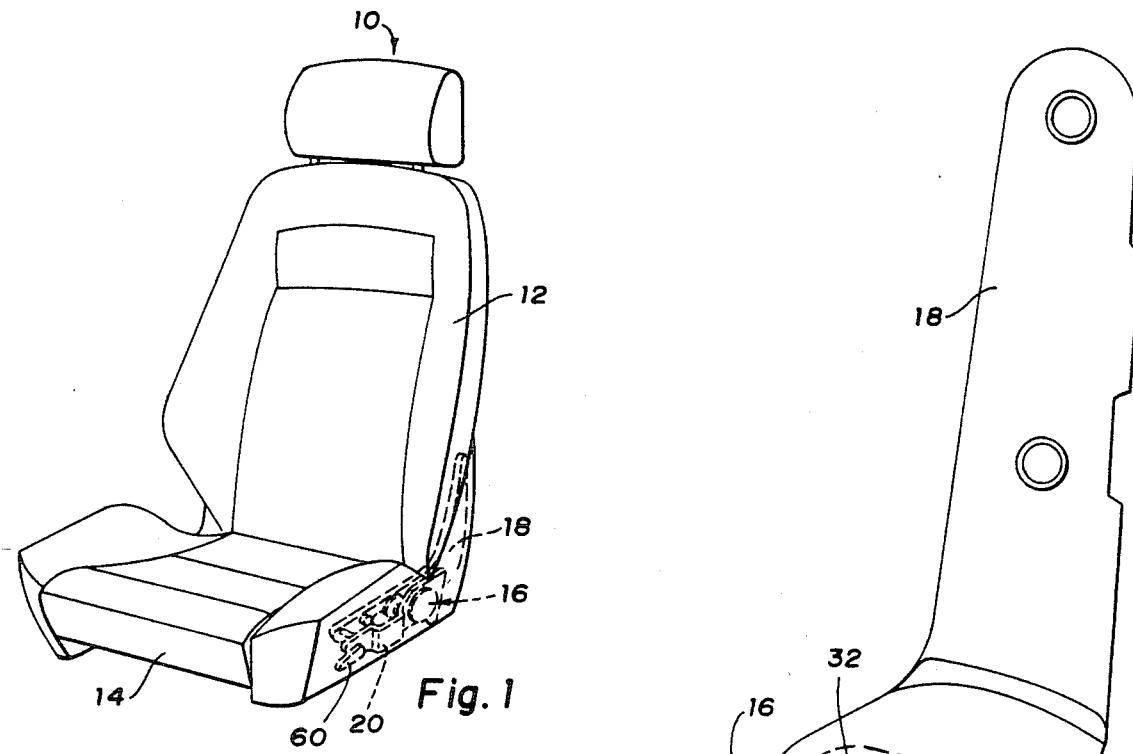
FIG. 1 is a perspective view of a preferred embodiment of the inventive recliner seat latch installed in a seat.

Referring to FIGS. 1, 2, 3 and 4, the recliner seat 10 has a back 12 pivotally joined to a seat cushion or femur member 14 along the inboard and outboard ends of the seat back 12. The outboard pivotal junction of seat back 12 and femur member 14 is provided by the recliner seat latch 16. The seat back 12 is attached to the seat back frame 18 of seat latch 16. The femur member 14 portion of the seat is attached to the base frame 20 of seat latch 16.

Figure 2:
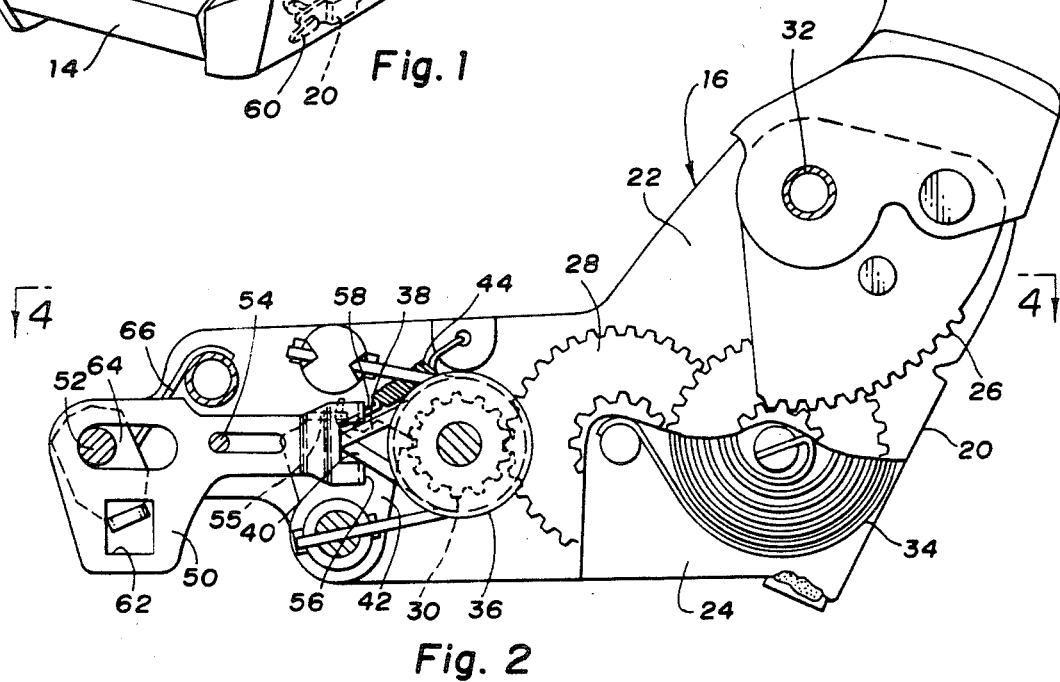
FIG. 2 is a front elevational view of the recliner seat latch illustrated in FIG. 1.
Figure 3:
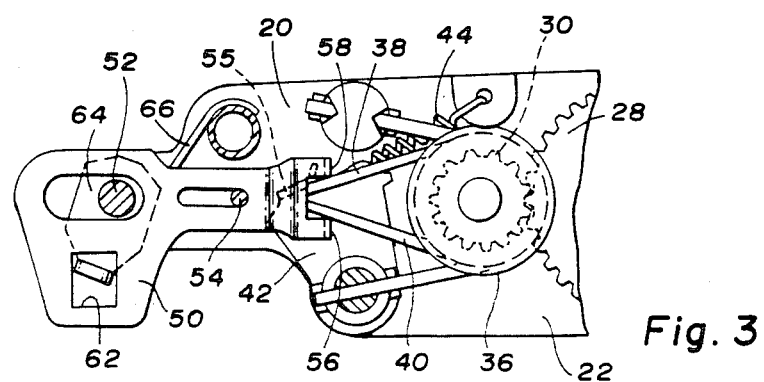
FIG. 3 is a fragmentary front elevational view of the recliner latch illustrated in FIG. 2 illustrating release of the locking mechanisms.

The seat back frame 18 is pivotally mounted within two generally parallel fixably connected plates 22 and 24 (FIG. 4) of the base frame 20. Pin 32 provides a pivotal axis for the seat back frame 18 with the base frame 20. The seat back frame 18 on its end adjacent to the base frame 20 has a sector gear 26 (FIG. 2). Clock spring 34 is provided to bias the seat back frame 18 angularly in an upward direction.

The sector gear 26 is operationally connected directly, or as in most applications indirectly, through a reducing intermediate gear train 28 to a clutch gear 30.

The clutch gear 30 is rotatably mounted to the base frame 20. The angular position or orientation of the clutch gear 30 is dependent upon and is a function of the angular position of the seat back frame 18.

The clutch gear 30 has fixably connected thereto a drum 36. Encircling the clutch drum 36 are means for infinitely restraining rotation of the clutch gear 30, first and second torsional springs 38 and 40 respectively. The torsional springs 38 and 40 are wound around drum 36 counter to one another. Both torsional springs will restrain rotation of drum 36 in either direction. However, one torsional spring will experience maximum restraining force when drum 36 rotates clockwise (looking at FIG. 2). The other torsional spring will experience maximum restraining force when drum 36 rotates counterclockwise. The first torsional spring 38 is provided to restrain rotation of drum 36 caused by the seat back frame 18 pivoting towards drum 36. The second torsion spring 40 is provided to restrain rotation of drum 36 caused by seat back frame 18 pivoting away from the drum 36. Therefore the seat back frame 18 is restrained in angular movement in either direction.

Pivotally mounted to the base frame 20 is a pawl 42. The pawl is biased by a spring 44 to engage with the teeth of the clutch gear 30. Rotation of clutch gear 30 resultant from a movement of seat back frame 18 in a predetermined direction (usually away from drum 36) will cause clutch gear 30 to urge pawl 42 into further engagement with the clutch gear 30.

Providing a means to selectively release the first and second torsional springs 38 and 40, and the pawl 42, is slider 50. Slider 50 is orientated generally parallel to base frame 20. The slider 50 is suspended over pins 52 and 54 which are attached to the base frame 20. The slider also has at its opposite end flanges 56 and 58 which compress ends of the torsion springs 38 and 40 (FIG. 2).

Axial movement of the slider 50 away from drum 36 causes slider flange 58 to make contact with pawl extension 55 (FIG. 4). The pawl is then pulled from engagement with the teeth of clutch gear 30. Thereafter slider 50 will also unwind the torsion springs 38 and 40 providing for the free rotation of drum 36.

Rotatably mounted to the base frame is a manually selectable release handle 60. The release handle has fixably connected thereto a lever 64 which fits into a first slot 62 of a slider 50.

In operation, to adjust the seat back 12 position the seat occupant will pivot the lever 64 via handle 60 causing the slider 50 to linearly move away from drum 36. As the slider 50 is axially pulled away from drum 36, pawl 42 is first released from engagement with clutch gear 30. After the disengagement of pawl 42, the flanges 56 and 58 of the slider move back upon the torsion springs 38 and 40 allowing the torsion springs to unwind, thereby releasing the drum 36 and allowing clutch gear 30 to rotate. The angular position of seat back 12 via seat back frame 18 can now be adjusted. After adjustment handle 60 is released, and slider 50 will return to its prior position from the energy stored in spring 66 (via lever 64). The torsion springs 38 and 40 first relock and then spring 44 returns pawl 42 into engagement with clutch gear 30. Since recliner seat latch 16 has infinite adjustment, pawl 42 sometimes will not engage with clutch gear 30. However spring 44 will cause pawl 42 to re-engage on clutch gear 30 if drum 36 experiences any slippage with respect to the torsion springs 38 and 40 beyond the distance of a single tooth of clutch gear 30.

FIGS. 5, 6 and 7 illustrate an alternative embodiment of the present inventive recliner seat latch. Recliner seat latch 116 has a seat back frame 118 pivotally mounted within a two-plate transversely separated fixably connected base frame 120 in a manner similar to recliner seat latch 16. Clock spring 134 is provided to bias seat back frame 118 in an upward direction. Additionally, recliner seat latch 116 has a second clutch gear and drum combination.

Sector gear 126 is operationally connected with first and second clutch gears 130 and 131 via gear train 128. Also, the angular positions of the clutch gears 130 and 131 are dependent upon the angular position of the seat back frame 118. First clutch gear 130 has a fixably connected drum 136 encircled by a first torsion spring 138. First clutch gear 130 is in mesh with the second clutch gear 131. Second clutch gear 131 has a fixably connected drum 137 encircled by a second torsion spring 140. The second clutch gear drum 137 and torsion spring 140 are provided to prevent seat back frame 118 from being pushed forward towards second clutch gear drum 137. The first clutch gear drum 136 and torsion spring 138 are provided to prevent seat back frame 118 from being pushed rearwardly away from first clutch gear drum 137. The advantage of this arrangement is that first torsion spring 138 can be made smaller because of the increased gear reduction between first clutch gear 130 and sector gear 126 provided by the addition of second clutch gear 131.

The release mechanism for the recliner seat latch 116 is a dual lever system. A first or pawl lever 142 is pivotally mounted to base frame 120 along pivotal axis 143 and is biased into locking engagement with second clutch gear 131 by spring 144 (FIG. 6). A second lever 150, also pivotally mounted to base frame 120, is provided to disengage pawl lever 142 and to release torsional spring 138 and 140 directly or indirectly so that the angular position of seat back frame 118 may be adjusted. Second lever 150 is biased angularly upward by spring 166 (FIG. 5).

Pawl lever 142 also has a projecting flange 155 (FIGS. 5 and 6). The second lever 150 has a flange 158 projecting over pawl flange 155. The second lever 150 also has another projecting flange 156.

To adjust the position of seat back frame 118, a pull upward of handle 160 causes second lever 150 to pivot angularly downwards. Second lever flange 158 contacts pawl lever flange 155, pulling the second pawl lever out of engagement with second clutch gear 131 to release the clutch gears. Thereafter, further movement of second lever 150 downward will cause flange 156 to move torsion spring 140 to the release position shown in phantom. Second lever flange 158 via pawl lever flange 155 will also cause spring 138 to move to the release position shown in phantom. Seat back frame 118 can now be adjusted. Release of handle 160 will allow second lever to be pivoted upward by spring 166. The torsional springs 140 and 138 will return to their previous locked positions. Thereafter, spring 144 will also cause the pawl 142 to re-engage with second clutch gear 131.

The present invention provides an improved method of infinitely adjusting a recliner seat, the method including the steps of:

1. Pivotally connecting a seat back frame 18 with a gear 26 at one end to a base frame with the gear 26 of the seat back frame adjacent to the base frame 20;

2. Angularly dependently connecting the gear 26 of the seat frame with a clutch gear 30 having a fixably connected drum 36;

3. Torsionally restraining the drum 36 with a torsion spring 38;

4. Lockingly engaging the clutch gear 30 with a pawl 42; and

5. Removing the pawl 42 and unwinding the torsion spring 38 to allow the clutch gear 30 to freely rotate whereby the angular position of the seat back frame 18 may be adjusted.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An improved infinitely variable recliner seat latch including in combination a base frame, a seat back frame pivotally mounted to said base frame, said seat back frame having a sector gear at an end of said seat back frame adjacent said base frame, at least one clutch gear rotatably mounted to said base frame, the angular position of said clutch gear being dependent upon the angular position of said seat back frame, means for infinitely restraining rotation of said clutch gear, wherein the improvement comprises:
 a pawl engageable with said clutch gear to lock said clutch gear from rotation; and
 means to release said pawl from engagement with said clutch gear and thereafter release said means of infinitely restraining rotation of said clutch gear allowing rotation of said clutch gear whereby the angular position of said seat back frame may be adjusted.

2. An improved infinitely variable recliner seat latch including in combination a base frame, a seat back frame pivotally mounted to said base frame, said seat back frame having a sector gear at an end of said seat back frame adjacent said base frame, at least one clutch gear having a fixably connected drum rotatably mounted to said base frame, the angular position of said clutch gear being dependent upon the angular position of said seat back frame, a first torsion spring encircling said drum for restraining rotation of said clutch gear, wherein the improvement comprises:
 a pawl engageable with said clutch gear to lock said clutch gear from rotation; and
 means to release said pawl from engagement with said clutch gear and thereafter release said first torsion spring allowing rotation of said clutch gear whereby the angular position of said seat back frame may be adjusted.

3. A seat back latch as described in claim 2 further including a second clutch gear with a fixably connected drum having an angular position dependent upon the angular position of said seat back frame and having a second torsion spring encircled thereupon for restraining motion of said second clutch gear, and further including a first lever for disengaging said pawl and a second lever for controlling said first lever and for disengaging said first and second torsion springs.

4. A seat back latch as described in claim 1 wherein said pawl is pivotally mounted to said base frame and wherein rotation of said clutch gear resultant of movement of said seat back frame in a predetermined direction causes said clutch gear to urge said pawl into further engagement with said clutch gear.

5. An improved infinitely variable recliner seat latch including in combination a base frame of two transversely spaced fixably connected plates, a seat back frame pivotally mounted to said frame within said plates, said seat back frame having a sector gear at an end of said seat back frame adjacent said base frame, a clutch gear rotatably mounted to said base frame having a fixably connected drum, the angular position of said clutch gear being dependent upon the angular position of said seat back frame, first and second torsion springs encircling said drum, said first torsion spring being provided for restraining rotation of said drum as said seat back frame pivots away from said drum and said second torsion spring being provided for restraining rotation of said drum when said seat back frame pivots towards said drum, wherein the improvement comprises:
 a pawl pivotally mounted to said base frame, said pawl being biased into engagement with said clutch gear and wherein rotation of said clutch gear resultant of movement of said seat back frame away from said clutch gear causes said clutch gear to urge said pawl into further engagement with said clutch gear; and
 a slider wherein axial movement of said slider releases said pawl from engagement with said clutch gear and thereafter releases said first and second torsion springs whereby the angular position of said seat back frame may be adjusted.

6. An improved infinitely variable recliner seat latch including in combination a base frame of two transversely spaced fixably connected plates, a seat back frame pivotally mounted to said base frame within said plates, said seat back frame having a sector gear at an end of said seat back frame adjacent said base frame, first and second clutch gears having fixably connected drums being rotatably mounted within said plates and having angular positions dependent upon the angular position of said seat back frame, first and second torsion springs encircling said first and second drums respectively for restraining rotation of said respective clutch gears wherein said first torsion spring is provided for restraining rotation of said first clutch drum when said seat back frame pivots away from said first drum and said second torsion spring is provided for restraining rotation of said second drum when said seat back frame pivots towards said second drum, wherein the improvement comprises
 a pawl lever pivotally mounted to said base frame biased into engagement with at least one of said clutch gears to prevent rotation of said clutch gears; and
 a second lever pivotally mounted to said seat frame and manually operable to pull said pawl lever out of engagement with at least one of said clutch gears to release said clutch gears and thereafter is operable to a position to release said first and second torsion springs whereby the angular position of said seat back frame may be adjusted.

7. An improved method of infinitely adjusting a recliner seat, said method in combination, including pivotally connecting a seat back frame with a gear at one end to a base frame with said gear of said seat back frame adjacent to said base frame, angularly dependently connecting said gear of said seat frame with a clutch gear having a fixably connected drum, torsionally restraining said drum with a torsion spring wherein the improvement comprises:
 lockingly engaging said clutch gear with a pawl; and
 removing said pawl and then unwinding said torsion spring to allow said clutch to freely rotate whereby the angular position of said seat back frame may be adjusted.

* * * * *